(12) United States Patent
Rounthwaite et al.

(10) Patent No.: US 7,603,718 B2
(45) Date of Patent: Oct. 13, 2009

(54) SYSTEMS AND METHODS FOR PROTECTING PERSONALLY IDENTIFIABLE INFORMATION

(75) Inventors: Robert L. Rounthwaite, Fall City, WA (US); Paul S Rehfuss, Seattle, WA (US); Gopalakrishnan Seshadrinathan, Redmond, WA (US); Kenneth G Richards, Newcastle, WA (US); Michael T Gahrns, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 11/095,931

(22) Filed: Mar. 31, 2005

(65) Prior Publication Data

US 2006/0225136 A1   Oct. 5, 2006

(51) Int. Cl.
*G06F 17/30* (2006.01)
(52) U.S. Cl. .............................. 726/26; 726/27; 726/28
(58) Field of Classification Search ................... 726/26, 726/27, 28
See application file for complete search history.

(56) References Cited

OTHER PUBLICATIONS

Client-side Defense Against Web-Based Identity Theft (2004), by Neil Chou, Robert Ledesma, Yuka Teraguchi, John C. Mitchell In NDSS: The 11th Annual Network and Distributed System Security Symposium Catamaran Resort Hotel San Diego, California Feb. 5, 2004-Symposium.*
Hutten et al., Trends in Spam Products and Methods, Microsoft, printed out year 2008.*
CEAS 2004 Accepted Papers by Topic, First Conference on Email and Anti-Spam (Jul. 30-Jul. 31, 2004).*
Filtering Spam E-mail on a Global Scale; Hulten, Goodman, Rounthwaite; year 2004.*
Self-managed heterogeneous certification in mobile ad hoc networks; Weihong Wang; Ying Zhu; Baochun Li; Vehicular Technology Conference, 2003. VTC 2003-Fall. 2003 IEEE 58th vol. 3, Oct. 6-9, 2003 pp. 2137-2141 vol. 3.*
A personal authentication scheme using mobile technology; Herrera-Joancomarti, J.; Prieto-Blazquez, J.; Information Technology: Coding and Computing [Computers and Communications], 2003. Proceedings. ITCC 2003. International Conference on; Apr.28-30, 2003 pp. 253-257.*
Location-based compromise-tolerant security mechanisms for wireless sensor networks; Yanchao Zhang; Wei Liu; Wenjing Lou; Yuguang Fang; Selected Areas in Communications, IEEE Journal on vol. 24, Issue 2, Feb. 2006 pp. 247-260.*

* cited by examiner

*Primary Examiner*—David Y Jung
(74) *Attorney, Agent, or Firm*—Lee & Hayes, PLLC (57) ABSTRACT

Techniques for protecting personally identifiable information are described. In an implementation, a method is described which includes analyzing heuristics which correspond to a communication to determine a likelihood that the communication relates to a fraudulent attempt to obtain personally identifiable information. A determination is made based on the determined likelihood of whether to perform one or more actions in conjunction with the communication.

20 Claims, 8 Drawing Sheets

602
Process the Communication based on Client-Specific Heuristics

604
Determine whether the Client has Previously Interacted the Originator of the Communication

606
Determine whether the Originator of the Communication is included in a "Favorites" List of the Client

608
Process using History Annotations (e.g., Duration of the Client History, Length of Time the Originator has Interacted with the Client, etc.)

610
Determine, based on the Examination, a Likelihood that the Communication was Sent from a Malicious Party that is Phishing for Personally Identifiable Information

SYSTEMS AND METHODS FOR PROTECTING PERSONALLY IDENTIFIABLE INFORMATION

TECHNICAL FIELD

The present invention generally relates to personally identifiable information and more particularly relates to systems and methods for protecting personally identifiable information.

BACKGROUND

A typical user's interaction with communications received over a network is ever increasing. For example, the user may send and receive hundreds of emails and instant messages in a given day, may access websites to receive web pages, and so on. Therefore, the user may receive a multitude of different types of communications which may provide a wide variety of functionality. However, as the functionality that is available to the user has continued to increase, so have the malicious uses of this functionality.

The user, for instance, may be subject to attack from a malicious party which is engaging in a fraudulent attempt to obtain personally identifiable information of the user. For example, the user may receive an email which indicates that the user's account information for a particular legitimate website is about to expire, such as credit information that is utilized by the user to access functionality at the website. The user is directed by the communication to navigate to a website to update this credit information. However, this website is not legitimate (e.g., is not provided as a part of the legitimate website), but rather is configured to obtain personally identifiable information from the user for malicious purposes, such as for use by the malicious party to purchase goods and services in the user's name. Therefore, this misappropriation of the personally identifiable information may have profound effects on the user, such as by ruining a credit rating of the user, cause the user to receive bills for goods and/or service that were not purchased by the user, and so on.

Therefore, there is a continuing need for improved techniques to protect personally identifiable information.

SUMMARY

Techniques for protecting personally identifiable information are described. In an implementation, a method is described which includes analyzing heuristics which correspond to a communication to determine a likelihood that the communication relates to a fraudulent attempt to obtain personally identifiable information. A determination is made based on the determined likelihood of whether to perform one or more actions in conjunction with the communication.

In another implementation, a method includes examining data contained in a communication to ascertain whether the communication includes a request for personally identifiable information. A likelihood is determined of whether the communication relates to a fraudulent attempt to obtain personally identifiable information based at least in part on the examining.

In a further implementation, a method includes examining a communication to locate one or more geographical discrepancies. A likelihood is determined, based at least in part on the examining, which describes whether the communication relates to a fraudulent attempt to obtain personally identifiable information.

BRIEF DESCRIPTION OF THE DRAWINGS

The same reference numbers are utilized in instances in the discussion to reference like structures and components.

DETAILED DESCRIPTION

Overview

Systems and methods to protect personally identifiable information are described. "Phishing" attacks are a large and growing problem. In these attacks, malicious parties attempt to entice users to send personally identifiable information. For example, a misleading communication (e.g., an email) may be presented that encourages the user to enter the personally identifiable information (e.g., billing information such as a credit card number and user name) into a fraudulent web site. Therefore, the malicious party may then utilize the personally identifiable information to make fraudulent purchases, which may ruin the user's credit rating and result in other general harm to the user.

Techniques are described to protect this personally identifiable information from "phishing" attacks. For example, a technique is described for intervening in the process of visiting a web site, entering the personally identifiable information via the web site, and/or submitting the personally identifiable information to the web site to help users regard possible "phishing" web sites with a proper level of suspicion. For instance, a technique may be utilized which analyzes heuristics for identifying a situation when personally identifiable information is to be entered into a potentially "untrustworthy" web site.

A variety of heuristics may be utilized to perform this identification. For example, the heuristics may describe an originator of the communication (e.g., how long the web site has been in existence, traffic flow, geographical location) and therefore indicate a likelihood that the originator is part of a "phishing" attack. In another example, heuristics which pertain to the communication itself (e.g., requests for personally identifiable information in the communication) may be utilized. In a further example, heuristics which pertain to a recipient of the communication (e.g., whether the originator of the communication is included in the recipients "favorites" list of web sites) may also be utilized to determine a likelihood of a "phishing" attack. A variety of other heuristics may also be utilized. Further discussion of exemplary applications of the variety of heuristics may be found in relation to FIGS. 3-7.

These heuristics may act as triggers to determine whether a likelihood of whether the communication is related to a "phishing" attack. Based on this likelihood, a variety of actions may be performed, such as warning a user as to the triggers which may indicate that the communication is likely a "phisher", adjusting a reputation of the originator in a reputation based system, and so on. Further discussion of actions that may be performed based on the likelihood may be found in relation to FIG. 8.

In the following discussion, an exemplary environment is first described which is operable to employ techniques for protecting personally identifiable information. Exemplary procedures are then described which may be employed in the exemplary environment, as well as in a variety of other environments without departing from the spirit and scope thereof.

Exemplary Environment

Figure 1:
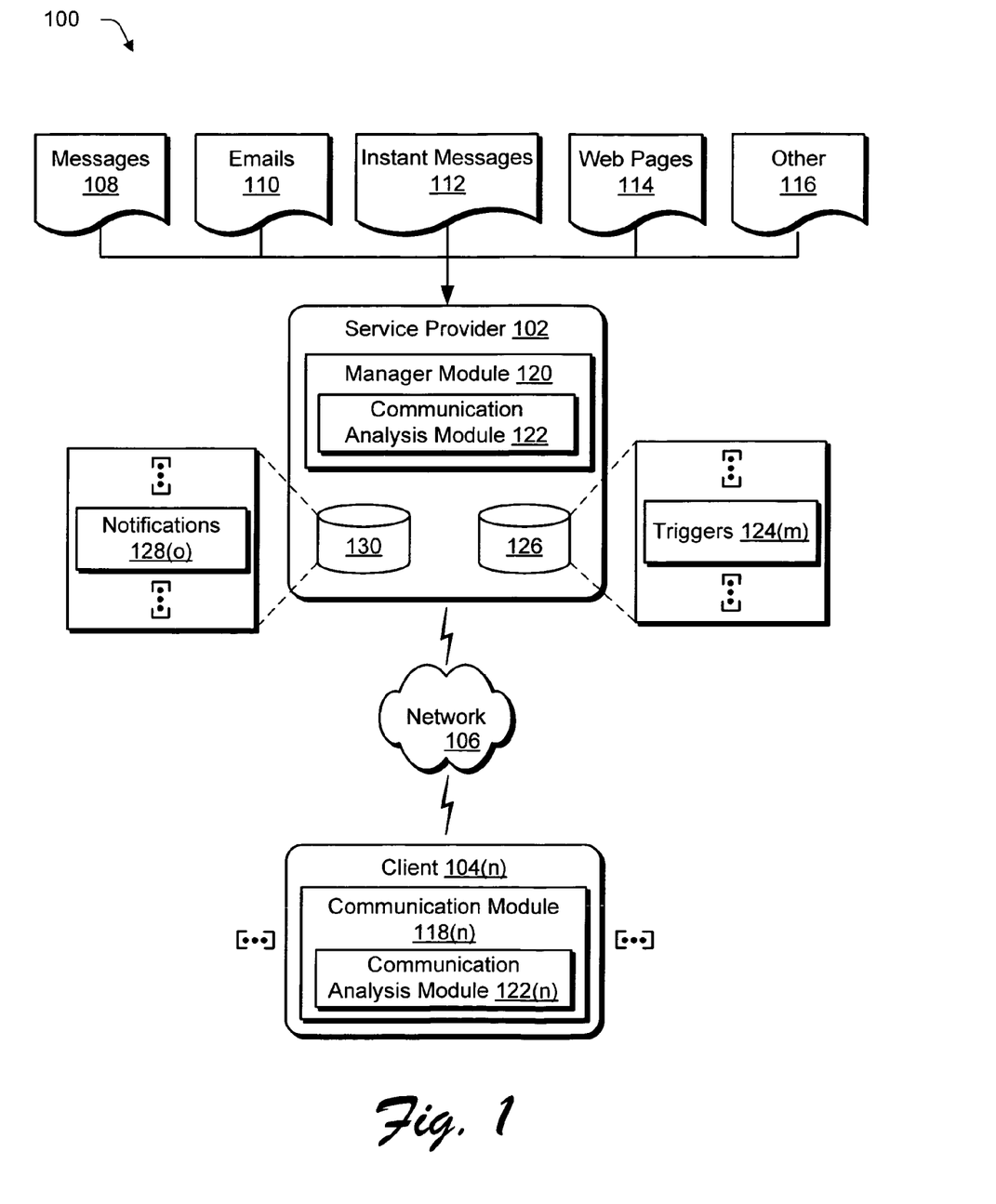
FIG. 1 is an illustration of an environment in an exemplary implementation that is operable to employ techniques for protecting personally identifiable information.

FIG. 1 is an illustration of an environment 100 in an exemplary implementation that is operable to employ techniques for protecting personally identifiable information. The illustrated environment 100 includes a service provider 102 which is communicatively coupled to a plurality of clients 104(n), where "n" can be any integer from one to "N", over a network 106. The clients 104(n) may be configured in a variety of ways for accessing the service provider 102. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory and/or processing resources (e.g., traditional set-top boxes, hand-held game consoles). The clients 104(n) may also relate to a person and/or entity that operate the clients. In other words, one or more of the clients 104(n) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, the client 104(n) may be communicatively coupled to the service provider 102 via a "dial-in" network to connect, via the service provider 102, to the Internet. In another instance, the plurality of clients 104(n) may be communicatively coupled to the service provider 102 via the Internet to exchange messages. A wide variety of other instances are also contemplated.

The service provider 102 may be configured in a variety of ways to provide a variety of functionality. For example, the service provider 102 may be configured to provide a variety of communications to the client 104(n), such as messages 108 (which may include email 110 and instant messages 112), web pages 114, and other 116 communications.

The service provider 102, for instance, may be configured to communicate messages between the plurality of clients 104(n). For example, each of the plurality of clients 104(n) is illustrated as including a respective one of a plurality of communication modules 118(n). In the illustrated implementation, each of the plurality of communication modules 118(n) is executable on a respective one of the plurality of clients 104(n) to send and receive messages. For example, one or more of the communication modules 118(n) may be configured to send and receive email 110. Email employs standards and conventions for addressing and routing such that the email may be delivered across the network 106 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 118(n) may be configured to send and receive instant messages 112. Instant messaging provides a mechanism such that each of the clients 104(n), when participating in an instant messaging session, may send text messages to each other. The instant messages are typically communicated in real time, although delayed delivery may also be utilized, such as by logging the text messages when one of the clients 104(n) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each client may respond to each other client as the instant messages are received.

In an implementation, the communication modules 118(n) communicate with each other through use of the service provider 102. The service provider 102 includes a manager module 120 to manage transfer of communications (e.g., the emails 110 and/or instant messages 112) between the plurality of clients 104(n). For instance, one of the clients 104(n) may cause the communication module to form an instant message for communication to another one of the clients 104(n). The communication module is executed to communicate the instant message to the service provider 102, which then executes the manager module 120 to route the instant message to the other one of the clients 104(n) over the network 106. The other client receives the instant message and executes the respective communication module to display the instant message to a respective user. In another instance, when the clients 104(n) are directly communicatively coupled, one to another (e.g., via a peer-to-peer network), the instant messages are communicated without utilizing the service provider 102.

In another example, the service provider 102 may be configured to store and route email, such as through configuration as an email provider. For instance, like the previous example, one of the clients 104(n) may execute the communication module to form an email for communication to the other client. The communication module communicates the email to the service provider 102 for storage. The other client, to retrieve the email, accesses the service provider 102 (e.g., by providing a user identification and password) and retrieves emails from a respective client's account. In this way, the other client may retrieve corresponding emails from one or more of the plurality of clients 104(n) that are communicatively coupled to the service provider 102 over the network 106. Although messages configured as emails and instant messages have been described, a variety of textual and non-textual messages (e.g., graphical messages, audio messages, and so on) may be communicated via the environment 100 without departing from the spirit and scope thereof.

In another example, the service provider 102 may be configured as an Internet service provider. For instance, to gain access to the web pages 114 over the Internet, each of the plurality of clients 104(n) may obtain a communicative coupling with the service provider 102 via a corresponding one of a plurality of access points. The access points may be configured in a variety of ways to provide access to the service provider 102, such as a plurality of telephone numbers for "dial-up" access, each access point may correspond to a single telephone number, one or more of the access points may be a wireless access point to provide a wireless communicative coupling (e.g., via a wireless wide area network (WAN), wireless telephone network for placing a wireless telephone call), a data distribution point for access by a computing device, and so on. For example, each of the access points may be configured to provide one or more "dial-up" access numbers for accessing the service provider 102 over a telephone network. Once a communicative coupling is obtained between the clients 104(n) and the service provider 102, the client 104(n) may receive web pages 114 via the service provider 102. Thus, in this example the service provider 102 provides communications configured as web pages 114 and other 116 data (e.g., downloadable songs, games, movies, documents, spreadsheets, newsgroup postings, web logs, and so on) to the client 104(n) over the network 106.

As previously described, "phishing" attacks are a growing problem in which malicious parties attempt to entice the clients 104(n) to provide personally identifiable information. For example, the client 104(n) may receive a fraudulent communication that indicates that the client's account information needs to be updated. The communication prompts the client 104(n) to navigate to a fraudulent website to enter personally identifiable information, such as name, mother's maiden name, social security number, credit card number and expiration date, billing address, and so on. The malicious parties may then use this information to steal money, obtain credit cards in the client's 104(n) name, and so forth.

To protect again "phishing" attacks, the manager module 120 may employ a communication analysis module 122 which is executable to determine a likelihood that a communication is related to an attack to obtain personally identifiable information of the client 104(n). For example, the communication analysis module 122, when executed, may utilize a plurality of triggers 124(m), where "m" can be any integer from one to "M", which are illustrated as stored in a database 126. The plurality of triggers 124(m) may be considered as factors which may be utilized to determine whether a communication is likely related to a "phishing" attack to obtain personally identifiable information.

The plurality of triggers 124(m) may be based on a variety of factors. For example, one or more of the plurality of triggers 124(m) may relate to heuristics of an originator of the communication, heuristics of the client 104(n) which is to receive the communication, data included in the communication itself, and so on. These triggers 124(j) may be utilized singly or in combination to determine a likelihood that the communication is related to a "phishing" attack. Based on this likelihood, a variety of actions may be performed.

The communication analysis module 122, for instance, may determine that the communication is likely related to a phishing attack due to a geographical location of an originator of the communication and a request for personally identifiable information contained in the communication itself. Based on this determination, the communication analysis module 122 may choose one of a plurality of notifications 128(o), where "o" can be any integer from one to "O", which are illustrated as stored in a database 130. For example, the communication analysis module 122 may choose one of the plurality of notifications 128(o) which describe the triggering factors which indicate that the communication is likely related to a "phishing" attack.

The manager module 120 may then cause the notification 128(o) to be transferred over the network 106 to the client 104(n) for output at the client 104(n). Therefore, the client 104(n) may be informed as to the likelihood that the communication is related to a "phishing" attack, as well as how this determination was made. Thus, the client 104(n) may make an informed decision as to the "reasoning" behind the determination and whether the client 104(n) agrees. For example, the determination may be based on geographical location. However, the client 104(n) may have purposefully accessed the web site from that geographical location, and therefore the geographical location of the originator of the communication is consistent with the client's 104(n) expectations. A variety of other actions may also be performed based on the determined likelihood, further discussion of which may be found in relation to FIG. 8.

Although execution of the communication analysis module 122 was described as being performed at the service provider 102, the client 104(n) may also include a communication analysis module 122(n) having similar functionality. For example, the communication analysis module 122(n) of the client 104(n) may utilize heuristics which are particular to the client 104(n) to determine a likelihood of whether the communication is related to a "phishing" attack. Therefore, although the following discussion may describe implementations in which the techniques are performed by the service provider 102, the client 104(n) may also perform one or more of these techniques. Further, performance of these techniques may be divided between the service provider 102 and the client 104(n). A variety of other instances are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the protection techniques described below are platform-independent, meaning that the techniques may be implemented on a variety of commercial computing platforms having a variety of processors.

Figure 2:
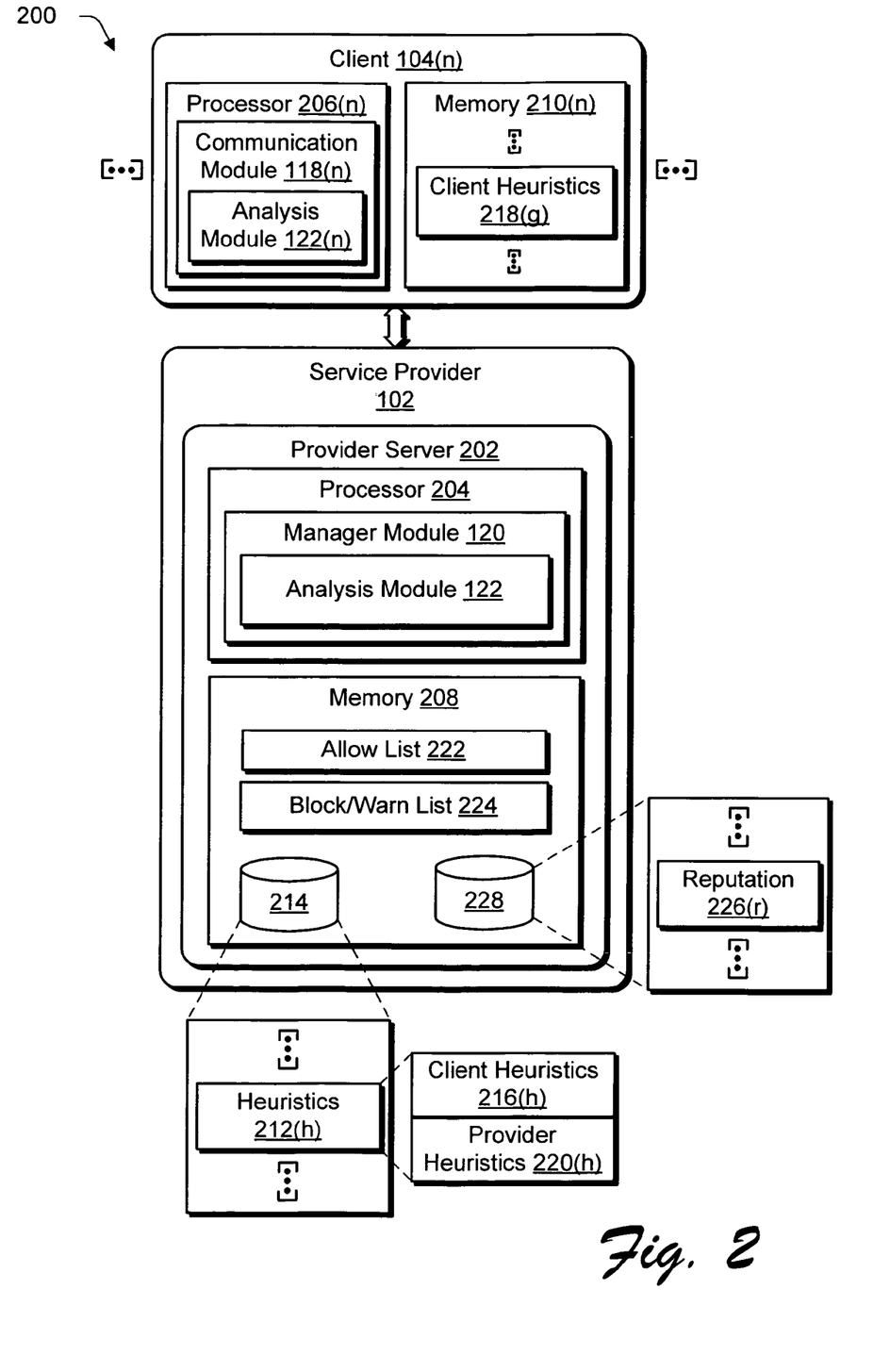
FIG. 2 is an illustration of a system in an exemplary implementation showing a service provider and a plurality of clients of FIG. 1 in greater detail.

FIG. 2 is an illustration of a system 200 in an exemplary implementation showing the service provider 102 and the plurality of clients 104(n) of FIG. 1 in greater detail. The service provider 102 is illustrated in FIG. 2 as being implemented by a provider server 202 and the client 104(n) is illustrated as a client device. Accordingly, the provider server 202 and the client 104(n) are illustrated as including a respective processor 204, 206(n) and a respective memory 208, 210(n).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208, 210(n) is shown, respectively, for the provider server 202 and the client 104(n), a wide variety of types and combinations of memory may be employed, such as random access memory (RAM), hard disk memory, removable medium memory, and so forth.

As previously described, the communication analysis module 122 (hereinafter "analysis module") may utilize a variety of techniques that may be used as "triggers" to perform a variety of actions based on a likelihood that a communication relates to an attack to fraudulently obtain personally identifiable information. For example, the analysis module 122 may collect a plurality of heuristics 212(h), where "h" can be any integer from one to "H", which are illustrated as stored in a database 214. The heuristics 212(h) may be collected from a variety of sources. For instance, the heuristics 212(h) may include client heuristics 216(h) which are collected from the plurality of client heuristics 218(g), where "g" can be any integer from one to "G", available from the plurality of clients 104(n). The client heuristics 216(h) may be configured in a variety of ways, such as to describe which web sites were visited by the clients 104(n), which web sites are "trusted" by the clients 104(n) (e.g., included in a "favorites" list), and so on. Further discussion of client heuristics 216(h) may be found in relation to FIGS. 3 and 6.

The heuristics 212(h) may also include provider heuristics 220(h) which relate to a provider (i.e., originator) of the communication. For example, the provider heuristics 220(h) may describe how long a provider (e.g., a web site) has been accessible to provide web pages, amount of traffic typically sent by the provider, geographical location of the provider, and so on. Further discussion of provider heuristics 220(h) may be found in relation to FIG. 4.

The heuristics 212(h) may be utilized by the analysis module 122 to perform a variety of actions. For example, the analysis module 122, when executed, may generate an allow list 222 which references "trusted" originators (i.e., senders) of communications and a block/warn list 224 which references "untrustworthy" originators of communications. For example, the allow list 222 may include a plurality of uniform resource locators (URLs) of websites which are deemed to be trustworthy, and therefore do not engage in "phishing" attacks. Likewise, the block/warn list 224 may include URLs of websites which are deemed to be "untrustworthy", such as websites which have a relatively high likelihood of engaging in a "phishing" attack. The referencing of the websites in the allow list 222 or the block/warn list 224 may be based on the determined likelihoods computed by the analysis module 122. For instance, the likelihood may be configured as a "score" which indicates a relative likelihood that the corresponding website engages in "phishing" attacks.

The heuristics 212(h) may also be utilized by the analysis module 122 to provide and/or adjust a plurality of reputations 226(r), where "r" can be any integer from one to "R", which are illustrated as stored in a database 228. For example, each reputation 226(r) may correspond to a particular website and indicate a relative likelihood of whether that particular website is a "phisher". The reputations 226(r) may be adjusted based on the likelihoods determined by the analysis module 122. Thus, the plurality of reputations 226(r) may provide a technique for comparison, one to another, of the relative likelihoods that particular websites are "phishers". The reputations may be utilized in a variety of other ways. For instance, when a reputation 226(r) indicates that a particular website, from which the client 104(n) has received a communication, is likely to engage in a "phishing" attack, the analysis module 122 may warn the client 104(n), such as through communication of one or more of the notifications 128(o) of FIG. 1. Further discussion of notifications and other actions may be found in relation to FIG. 8.

As previously described, the client 104(n) may also employ an analysis module 122(n), which is illustrated as being executed on the processor 206(n) and is storable in memory 210(n). The analysis module 122(n), when executed, may provide similar functionality as previously described for the analysis module 122 of the service provider 102. For instance, the analysis module 122(n) may examine heuristics which describe traffic to and from the originator of the communication, may examine the communication itself for requests for personally identifiable information, and so on. Additionally, the analysis module 122(n) may utilize heuristics which are particular to the client 104(n) itself, such as whether the client 104(n) has previously visited the originator without being prompted (e.g., navigated to the website without previously receiving a communication from the originator), whether the originator is included in a "favorites" list in a browser for quick navigation to the originator, and so on. Thus, heuristics that are particular to the client itself may be utilized to determine whether the originator and/or the communication itself relates to a fraudulent request for personally identifiable information.

Exemplary Procedures

The following discussion describes protection techniques that may be implemented utilizing the previously described systems and devices. Aspects of each of the procedures may be implemented in hardware, firmware, or software, or a combination thereof The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
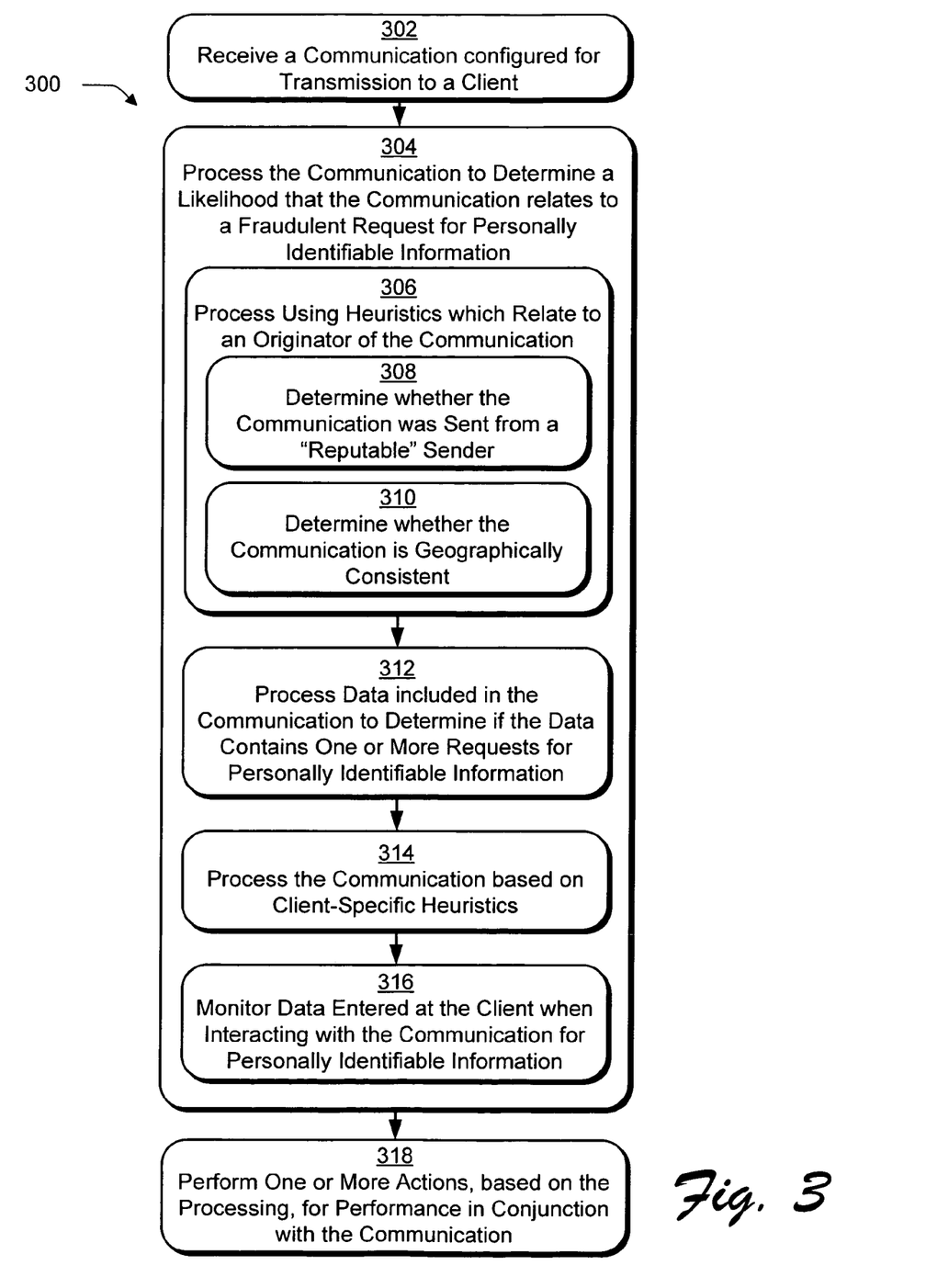
FIG. 3 is a flow diagram depicting a procedure in an exemplary implementation in which a communication is processed to determine a likelihood that the communication relates to a fraudulent request for personally identifiable information of a client.

FIG. 3 is a flow diagram depicting a procedure 300 in an exemplary implementation in which a communication is processed to determine a likelihood that the communication relates to a fraudulent request for personally identifiable information of a client. A communication is received which is configured for transmission to a client (block 302). For example, the communication may be received by the service provider 102 from an originator of the communication. In another example, the communication may be received by the client 104(n). The communication may be configured in a variety of ways, such as a message 108 (e.g., email 110, instant message 112, and so on), a web page 114, or other 116 communication.

The communication is processed to determine a likelihood that the communication relates to a fraudulent request for personally identifiable information (block 304). This processing may be performed in a variety of ways and based on a variety of triggering factors. For example, the communication may be processed using heuristics which relate to an originator of the communication (block 306). The heuristics, for instance, may provide a determination of whether the communication was sent from a "reputable" sender (block 308), such as based on a reputation 226(r) generated for the particular sender. In another instance, the heuristics may provide a determination of whether the communication is geographically consistent (block 310). For example, the heuristics might describe a geographical disparity between the location the personally identifiable information is to be sent and a location, from which, frameset pages were sent. A variety of other heuristics may be utilized which relate to the originator of the communication, further discussion of which may be found in relation to FIG. 4.

The processing may also include processing data included in the communication to determine if the data contains one or more requests for personally identifiable information (block 312). For example, the communication may contain a request to update billing information, such as mother's maiden name, billing address, client name, credit card number and expiration date, and so on. Therefore, the analysis module 122, when executed, may determine if such requests exist in the communication and determine a likelihood, based at least in part, of whether the communication relates to a fraudulent request for personally identifiable information. Further discussion of examination of the communication itself may be found in relation to FIG. 5.

Additionally, the processing may include use of client-specific heuristics (block 314). For instance, a URL of the originator of the request may be compared with URLs included in a history of browsed websites. If frequent activity of the client with the URL is noticed, this may indicate that the originator is not a "phisher". In another instance, a determination may be made as to whether the URL of the originator is included in a "favorites" list of websites, to which, the client frequently navigates. If the URL is included in the "favorites" list, this may be utilized to decrease the likelihood that the originator is engaging in a "phishing" attack. Thus, the triggers (e.g., previous navigation by the client) may also be utilized to decrease the likelihood that the originator is a malicious party, further discussion of which may be found in relation to FIG. 6.

Further, the analysis module 122 may process the communication by monitoring data entered at the client when interacting with the communication for personally identifiable information (block 316). For example, the analysis module 122 may keep a listing of formats typically utilized to enter personally identifiable information, such as four groupings of four numbers each for credit card information, dates, addresses (e.g., for "street", directions, and so on), and combinations thereof. In another example, the analysis module 122(n) of the client 104(n) may compare data entered at the client 104(n) with a list of personally identifiable information of the client 104(n). For instance, the client 104(n) may include a listing of credit card information, billing address, full name, expiration dates, and so on. The analysis module 122(n), when executed, may compare information entered at the client 104(n) with this list to determine whether personally identifiable information has been entered. Entry of this information may therefore be utilized to determine the likelihood that the communication relates to a fraudulent attempt to obtain the personally identifiable information, further discussion of which may be found in relation to FIG. 7.

One or more actions may then be performed based on the processing, for performance in conjunction with the communication (block 318). For example, a likelihood may be determined based on one or more of the heuristics which relate to the originator (block 306), data included in the communication (block 312), client-specific heuristics (block 314), data entered at the when interacting with the communication (block 316), and so on. This likelihood may be utilized to determine whether an action should be performed, and if so, which action. For instance, a relatively "high" likelihood may be utilized to block a reply communication from the client 104(n) which includes personally identifiable information, while a relatively "low" likelihood may indicate that a warning should be output, but submission of personally identifiable information is not to be blocked. A variety of other actions may also be performed, further discussion of which may be found in relation to FIG. 8.

Figure 4:
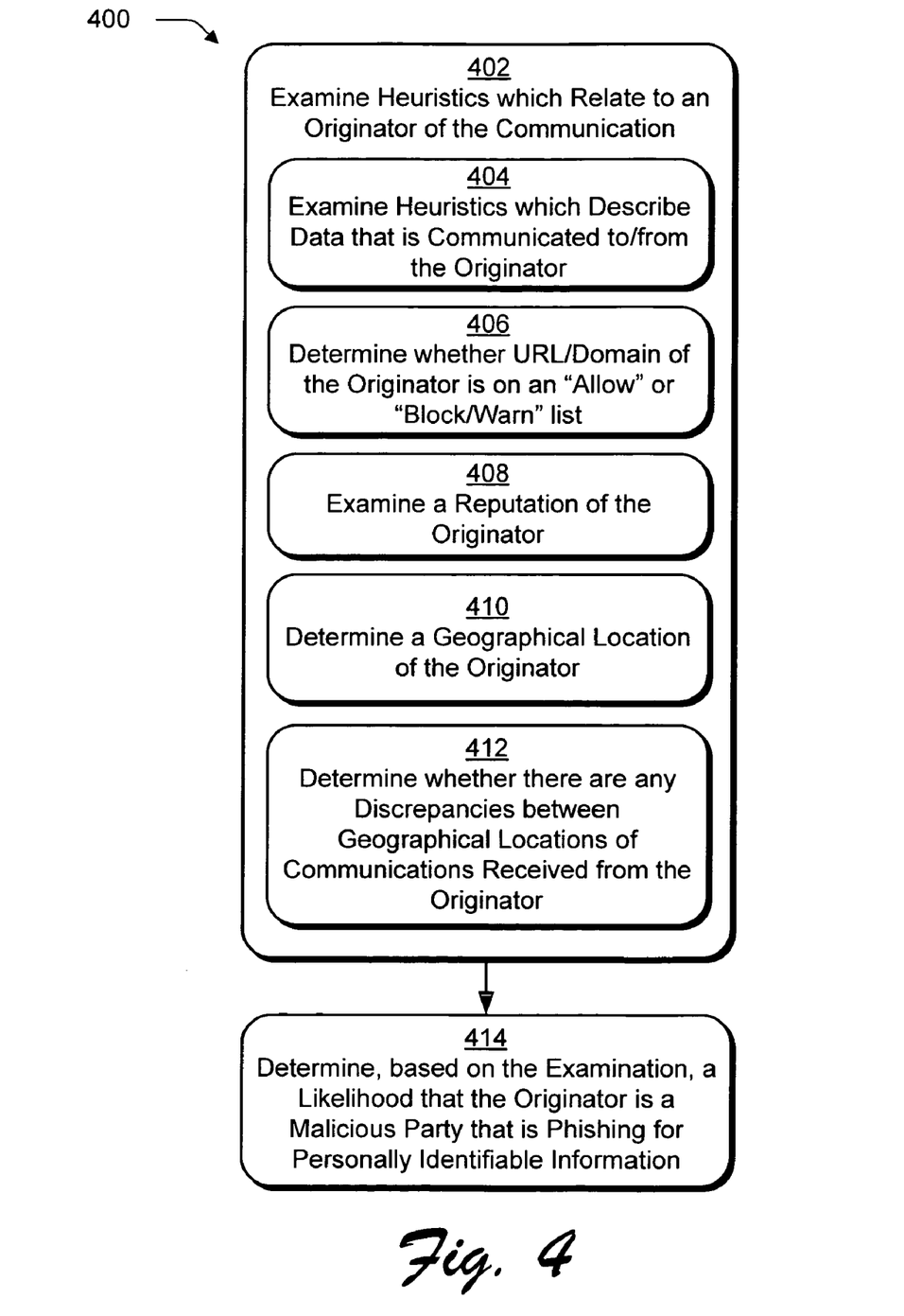
FIG. 4 is a flow diagram depicting a procedure in an exemplary implementation in which heuristics which relate to an originator of a communication are examined to determine a likelihood that the originator is engaging in a fraudulent attempt to acquire personally identifiable information.

FIG. 4 is a flow diagram depicting a procedure 400 in an exemplary implementation in which heuristics which relate to an originator of a communication are examined to determine a likelihood that the originator is engaging in a fraudulent attempt to acquire personally identifiable information. Heuristics are examined which relate to an originator of the communication (block 402). For example, heuristics may be examined which described data that is communicated to/from the originator (block 404), such as traffic statistics (changes a rate of data flow, quantity of data, and so on), how long the originator has been operable, number of clients which communicate with the originator, and so on.

In another example, a determination is made as to whether a URL/domain of the originator is on an "allow" or "block/warn" list (block 406). For instance, the analysis module 122, when executed, may examine the plurality of heuristics 212(h) to generate an allow list 222 which describe websites, from which, communications are allowed, such as trusted websites based on past history, partner websites, and so on. The analysis module 122, when executed, may also generate a block/warn list 224 of websites which are to be avoided, such as previously identified "phishers", and so on. Therefore, these lists, as computed from the heuristics, may be utilized by the analysis module 122 to quickly determine whether a communication is obtained from a "trustworthy" originator as indicated by the allow list 222 or an originator is "untrustworthy", as indicated by the block/warn list 224.

If a further example, a reputation of the originator is examined (block 408). For example, the analysis module 122 may examine feedback obtained from the plurality of clients 104(n) which describe past interaction with particular websites. This feedback may be utilized to generate a reputation for each website, which may be utilized to help determine a likelihood of whether the originator is "trustworthy" (i.e., not a "phisher") or "untrustworthy".

In yet another example, a geographical location of the originator may be determined (block 410) for use in determining a likelihood that the originator is a "phisher". For example, the communication may be obtained from a generic top level domain, such as ".com", ".org", ".name", and so on, which does not indicate where the originator is located. Therefore, this lack of detailed geographical information may be utilized to indicate that it is more likely that the originator is a "phisher". In another example, the originator may correspond to a geographical location that is notoriously untrustworthy. In a further example, there may be discrepancies regarding communications received from the originator (block 412). For example, the home webpage may originate from a first country, but a second webpage for entering personally identifiable information may originate from a different country. A variety of other geographical considerations may also be utilized, further discussion of which may be found in relation to the following figures.

A determination is made, based on the examination, of a likelihood that the originator of the communication is a malicious party that is engaged in a fraudulent attempt to obtain personally identifiable information (block 414). For example, the examinations and determinations (e.g., blocks 404-412) may be weighted to arrive at a likelihood value based on the heuristics which relate to the originator of the communication. This likelihood may be utilized with other likelihoods to determine which action, if any should be performed, further discussion of which may be found in relation to FIG. 8.

Figure 5:
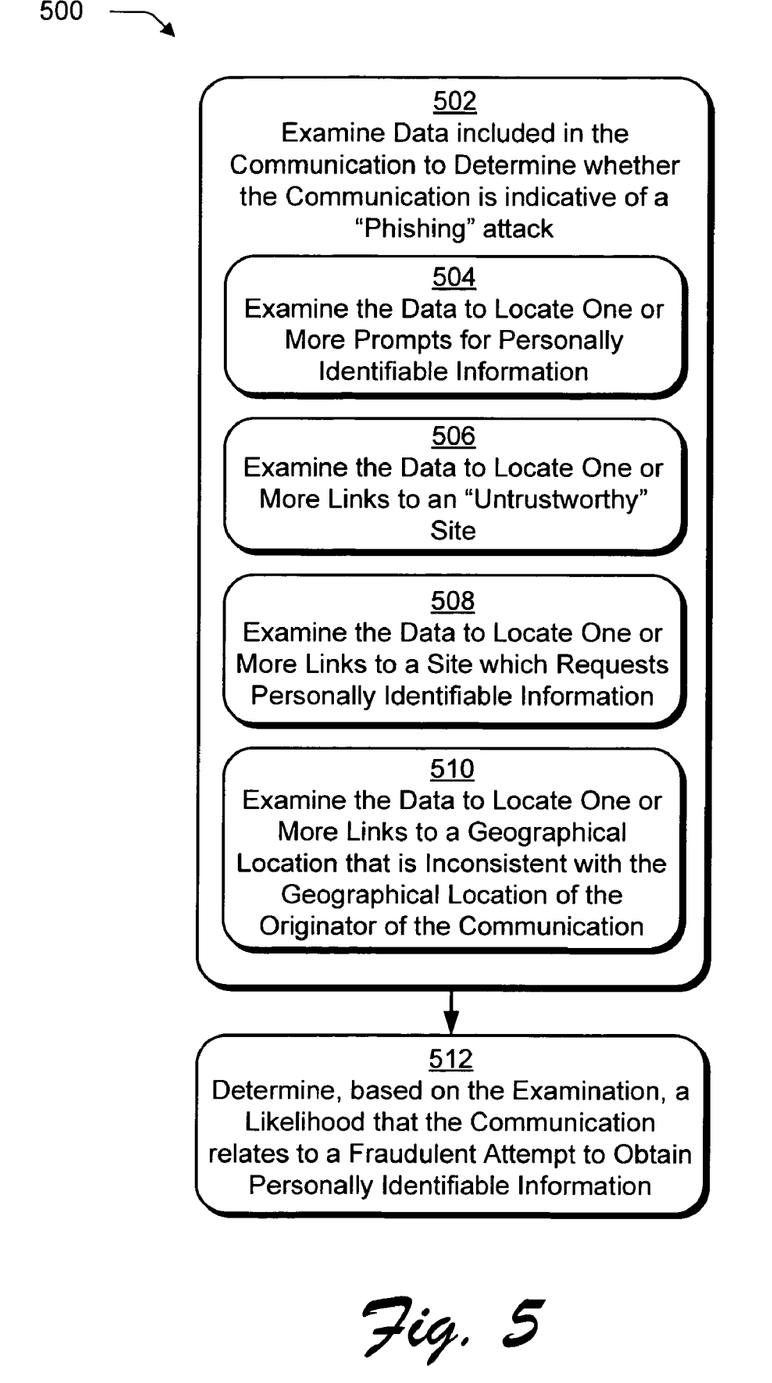
FIG. 5 is a flow diagram depicting a procedure in an exemplary implementation in which data included in a communication is examined to determine whether the communication is indicative of an attempt to fraudulently obtain personally identifiable information.

FIG. 5 is a flow diagram depicting a procedure 500 in an exemplary implementation in which data included in a communication is examined to determine whether the communication is indicative of an attempt to fraudulently obtain personally identifiable information. The analysis module is executed to examine data included in the communication to determine whether the communication is indicative of a "phishing" attack (block 502). This examination may be performed in a variety of ways.

The analysis module, for instance, may be executed to examine the data to locate one or more prompts for personally identifiable information (block 504). For example, the data in the communication may include text which requests a "mother's maiden name", "pet's name", "credit card number", "expiration date", "security code", "billing address", and so on. The existence of this data in the communication may increase a likelihood that the communication relates to a "phishing" attack.

In another instance, the analysis module examines the data to locate one or more links to an "untrustworthy" site (block 506). For example, the analysis module may compare the URLs in the link with the allow list 222 and the block/warn list 224 to determine whether that particular URL referenced by the link is "trustworthy" or "untrustworthy" based on a previously made determination.

If a further instance, the analysis module examines data to locate one or more links to a site which requests personally identifiable information (block 508). This instance may be thought of as a combination of the two previous instances, in which the analysis module 122 examines a destination referenced by a link to determine if the destination includes prompts for personally identifiable information. As before, the existence of these prompts may increase the likelihood that the communication is related to a fraudulent attempt to obtain personally identifiable information.

In yet another instance, the analysis module examines the data to locate one or more links to a geographical location that is inconsistent with the geographical location of the originator of the communication (block 510). For example, the communication may correspond to a first geographical location that is different than a geographical location, at which, the client is to be directed via the link. Therefore, this inconsistency of the geographical locations may indicate a likelihood of a "phishing" attack. A variety of other geographical considerations may also be utilized, such as based on the client itself, further discussion of which may be found in relation to FIG. 6.

A determination is then made based on the examination of a likelihood that the communication relates to a fraudulent attempt to obtain personally identifiable information (block 512). As before, each of the "triggers" addressed by the various examinations (blocks 504-510) may be utilized, singly or in combination, to determine a likelihood that the communication relates to a "phishing" attack.

Figure 6:
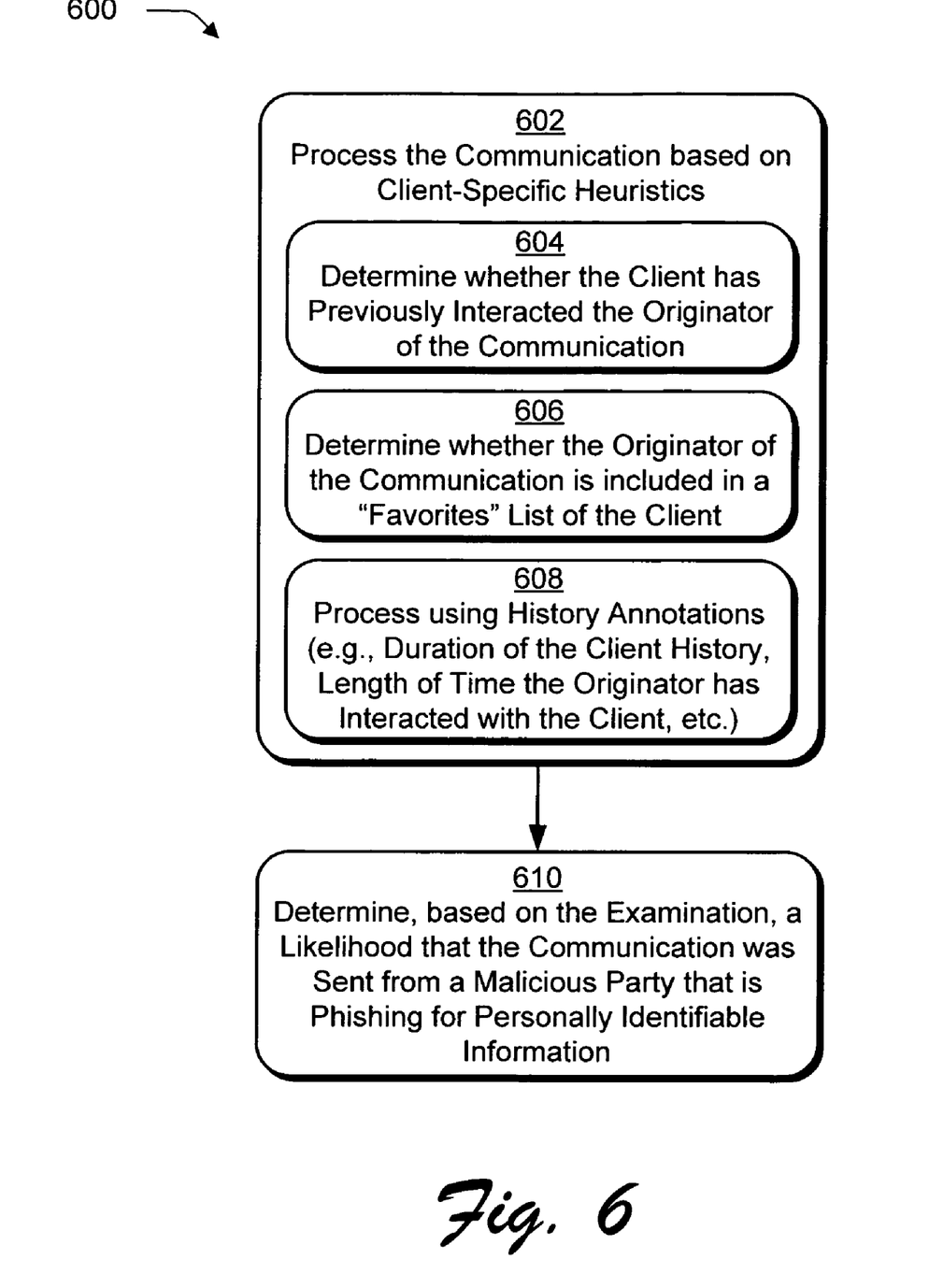
FIG. 6 is a flow diagram depicting a procedure in an exemplary implementation in which client-specific heuristics are utilized to determine a likelihood that a fraudulent request has been received for personally identifiable information.

FIG. 6 is a flow diagram depicting a procedure 600 in an exemplary implementation in which client-specific heuristics are utilized to determine a likelihood that a fraudulent request has been received for personally identifiable information. The communication may be processed utilizing client-specific heuristics (block 602) in a variety of different ways.

The communication, for instance, may be processed to determine whether the client has previously interacted with the originator of the communication (block 604). For example, the analysis module may examine a history of previously-visited websites (e.g., a browser history) to determine whether the client has visited the website, from which, the communication was received. If the client has a history of visiting the website, then this may indicate that the website is "trusted" and in unlikely to be "phishing" for personally identifiable information. In another example, a determination of whether the client has previously submitted personally identifiable information to the originator may also be utilized in the processing. A variety of other examples of client interaction are also contemplated.

A determination may also be made as to whether the originator of the communication is included in a "favorites" list on the client (block 606). For example, a browser executed on the client may include a "favorites" list of websites which are specified by a user of the client. Accordingly, these websites may be deemed "trustworthy" by the client and utilized as a factor in determining a likelihood that the communication relates to a "phishing" attack. Various degrees of "inclusion" may be utilized, such as inclusion of the exact URL of the originator in the favorites list, inclusion of the domain of the originator in the favorites list, and so on.

The communication may also be processed utilizing history annotations (block 608), such as a duration of the client history, length of time the originator has interacted with the client, and so on. For example, the analysis module may give a weight to the client's history based on the length of the clients history, such as by giving a greater weight to a long and detailed client history with the originator that lasted over a period of years than a history having a total duration of a week.

As before, a determination is then made, based on the examination (e.g., blocks 604-608), of a likelihood that the communication was sent from a malicious party that is "phishing" for personally identifiable information (block 610). Although a few examples have been described which relate to client-specific heuristics, a variety of other examples are also contemplated without departing from the spirit and scope thereof.

Figure 7:
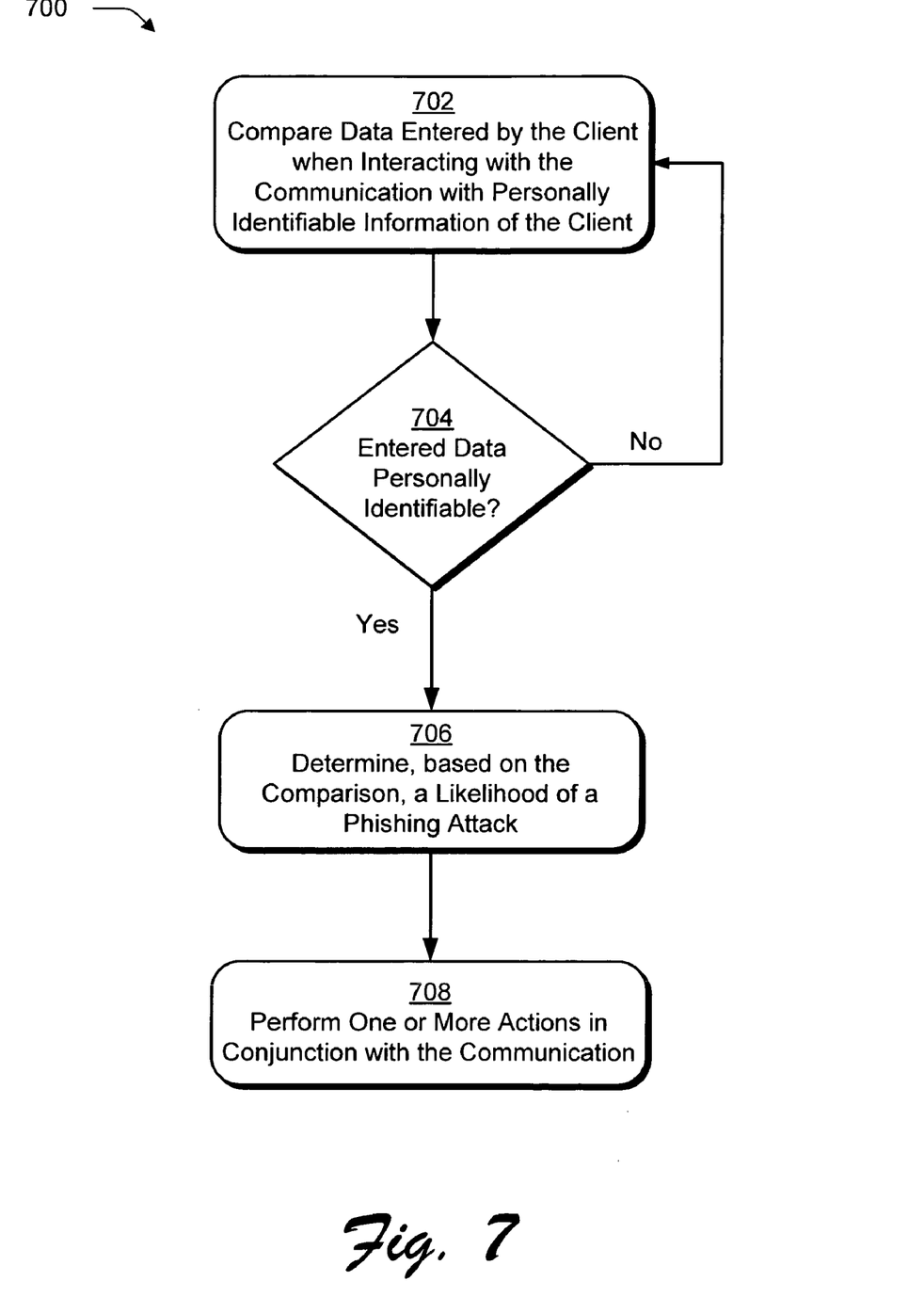
FIG. 7 is a flow diagram depicting a procedure in an exemplary implementation in which data entered by a client through interaction with a communication is monitored to determine whether the data contains personally identifiable information.

FIG. 7 is a flow diagram depicting a procedure 700 in an exemplary implementation in which data entered by a client through interaction with a communication is monitored to determine whether the data is personally identifiable information. Data entered by the client when interacting with the communication is compared with personally identifiable information of the client (block 702). For example, the client may include a list of data which personally identifies the client, such as name, alias, address, credit card number, expiration date, mother's maiden name, pet's name, and so on.

A determination is then made as to whether the entered data is personally identifiable (decision block 704). If the entered data is not personally identifiable ("no" from decision block 704), subsequent data entered by the client is compared (block 702).

If the entered data is personally identifiable ("yes" from decision block 704), a determination is made, based at least in part on the comparison, of a likelihood of a "phishing" attack (block 706). For example, the trigger of entering the personally identifiable information may be utilized in conjunction with a plurality of other triggers (e.g., originator heuristics, data contained in the communication itself, client-specific heuristics, etc.) to determine an overall likelihood that the communication, and consequently an originator of the communication, is engaging in a fraudulent attempt to obtain personally identifiable information. One or more actions may then be performed in conjunction with the communication (block 708) based on the determined likelihood, further discussion of which may be found in relation to the following figures.

Figure 8:
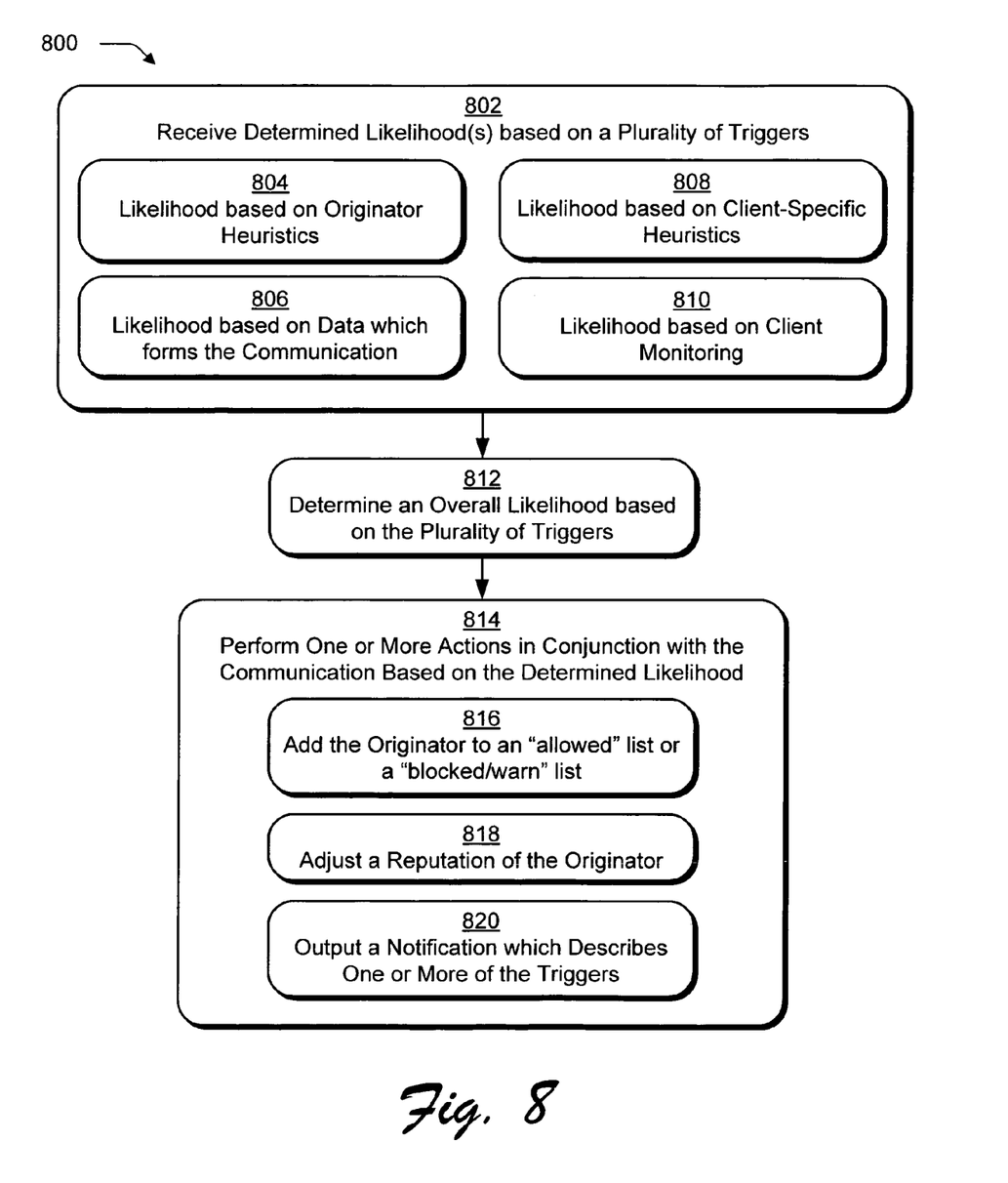
FIG. 8 is a flow diagram depicting a procedure in an exemplary implementation in which a determination is made based on a plurality of triggers as to a likelihood that a communication is related to a fraudulent request for personally identifiable information, one or more of a plurality of actions are then performed based on the determined likelihood.

FIG. 8 is a flow diagram depicting a procedure 800 in an exemplary implementation in which a determination is made based on a plurality of triggers as to a likelihood that a communication is related to a fraudulent request for personally identifiable information, one or more of a plurality of actions are then performed based on the determined likelihood. A plurality of determined likelihoods is received based on a plurality of triggers (block 802). For example, an analysis module may compute a likelihood based on originator heuristics (block 804), an example of which was described in relation to the procedure 400 of FIG. 4. In another example, the analysis may compute a likelihood based on data which forms the communication (block 806), an example of which was described in relation to the procedure 500 of FIG. 5. In yet another example, a likelihood is received based on client-specific heuristics (block 808), an example of which was described in relation to the procedure 600 of FIG. 6. In a further example, a likelihood is received based on client monitoring (block 810), an example of which was described in relation to the procedure 700 of FIG. 7.

One or more of these likelihoods may be utilized to determine an overall likelihood (block 812) that the communication is related to a phishing attack. For example, each likelihood may be represented as a numerical value. These numerical values may be combined to arrive at an overall likelihood "score" that is indicative of a relative degree of certainty that the communication is related to a phishing attack. These numerical values may be computed and arranged in a variety of ways. For example, the analysis module may give different weights to different triggers based on a variety of factors. For instance, the client-specific heuristics may be based on a client history of only a few days. Therefore, the analysis module may give less weight to the likelihood value computed from the client-specific heuristics. A variety of other examples are also contemplated. 10072J One or more actions are then performed in conjunction with the communication based on the determined likelihood (block 814). For example, the originator may be added to an "allowed" list or a "blocked/warn" list (block 816) based on the determined likelihood. Therefore, subsequent communications from that originator may be processed utilizing these lists. In another example, a reputation of the originator is adjusted (block 818). For example, a plurality of reputations 226(r) may be generated, each of which describes a respective originator. The reputations 226(r) may be generated in a variety of ways, such as based on feedback obtained from the plurality of clients 104(n), generated based on heuristics 212(h), and so forth. These reputations 226(r) may be adjusted based on the determined likelihoods, and therefore reflect the variety of triggers which were utilized to determine the likelihood.

In another example, a notification is output which describes one or more of the triggers (block 820). For example, the notification may be chosen by the analysis module 122 based on which of the plurality of triggers (blocks 804-810) indicated that the communication likely relates to a fraudulent activity to obtain personally identifiable information. The notification may then be output by the client and thereby inform a user of the client as to what triggered the notification. In this way, the user may take appropriate action, such as to avoid providing personally identifiable information, verify the originator is "who they say they are", and so on. A variety of other actions may also be performed based on the determined likelihood without departing from the spirit and scope thereof. For example, the relative likelihood may be utilized to choose from a hierarchy of actions. For instance, a relatively "low" likelihood may cause a warning to be output, whereas a relatively "high" likelihood may cause the client 104(n) to be blocked from interacting with originator.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
analyzing heuristics which correspond to an originator of a network communication, the heuristics including:
    data traffic statistics of the originator,
    a length of operation of the originator,
    a geographic location associated with a communication of the originator,
    a reputation of the originator, and
    a number of clients which communicate with the originator,
wherein the analyzing includes determining whether there are discrepancies between geographic locations associated with communications of the originator, examining the reputation of the originator, and determining whether a domain of the originator is on an allow list or a block list;
determining a likelihood that the network communication relates to a fraudulent attempt to obtain personally identifiable information based on the analyzed heuristics; and
performing one or more actions in conjunction with the network communication based on the determined likelihood.

2. A method as described in claim 1, wherein the network communication is one of the group consisting of:
    a message;
    an email;
    an instant message; and
    a webpage.

3. A method as described in claim 1, further comprising transmitting the network communication over the Internet, a wide area network (WAN), a local area network (LAN), an intranet, a wireless network, or a telephone network.

4. A method as described in claim 1, wherein the heuristics further correspond to an intended recipient of the network communication.

5. A method as described in claim 1, wherein the heuristics further correspond to data which is included in the network communication.

6. A method as described in claim 1, wherein the heuristics further correspond to one or more geographical considerations.

7. A method as described in claim 1, wherein the determined likelihood is a relative value.

8. A method as described in claim 1, wherein one or more of the actions are selected from the group consisting of:
- blocking submission of personally identifiable information;
- adjusting a reputation of the originator;
- adding a reference to the originator to an "allow" list;
- adding a reference to the originator to a "block/warn" list; and
- outputting a notification to warn of the determined likelihood that describes one or more factors which indicate that the network communication likely relates to a fraudulent attempt to obtain personally identifiable information.

9. A method, comprising:
- analyzing heuristics which correspond to a recipient of a network communication, the heuristics including:
  - a duration of history between the recipient and an originator of the network communication, and
  - a total time of interaction between the recipient and the originator,
- wherein the analyzing includes determining whether the originator is included in a favorites list of the recipient;
- examining the network communication to locate one or more links to a geographic location that is inconsistent with the geographic location of the originator;
- determining a likelihood that the network communication relates to a fraudulent attempt to obtain personally identifiable information based on the analyzed heuristics and on the examined network communication; and
- performing one or more actions in conjunction with the network communication based on the determined likelihood.

10. A method as described in claim 9, wherein the network communication is one of a group consisting of:
- a message;
- an email;
- an instant message; and
- a webpage.

11. A method as described in claim 9, further comprising transmitting the network communication over the Internet, a wide area network (WAN), a local area network (LAN), an intranet, a wireless network, or a telephone network.

12. A method as described in claim 9, wherein the heuristics further correspond to an originator of the network communication.

13. A method as described in claim 9, wherein the heuristics further correspond to data which is included in the network communication.

14. A method as described in claim 9, wherein the determined likelihood is a relative value.

15. A method as described in claim 9, wherein one or more of the actions are selected from the group consisting of:
- blocking submission of personally identifiable information;
- adjusting a reputation of the originator;
- adding a reference to the originator to an "allow " list;
- adding a reference to the originator to a "block/warn " list; and
- outputting a notification that describes one or more factors which indicate that the network communication likely relates to a fraudulent attempt to obtain personally identifiable information.

16. A computer-readable medium comprising computer readable instructions that, when executed, cause one or more processors to perform acts including:
- analyzing originator heuristics which correspond to an originator of a network communication, the heuristics including:
  - data traffic statistics of the originator,
  - a length of operation of the originator,
  - a geographic location associated with a communication of the originator,
  - a reputation of the originator, and
  - a number of clients which communicate with the originator,
- wherein the analyzing includes determining whether there are discrepancies between geographic locations associated with communications of the originator, examining the reputation of the originator, and determining whether a domain of the originator is on an allow list or a block list;
- analyzing recipient heuristics which correspond to a recipient of the network communication, the recipient heuristics including:
  - a duration of history between the recipient and the originator, and
  - a total time of interaction between the recipient and the originator,
- wherein the analyzing includes determining whether the originator is included in a favorites list of the recipient;
- examining the network communication to locate one or more links to a geographic location that is inconsistent with the geographic location of the originator;
- determining a likelihood that the network communication relates to a fraudulent attempt to obtain personally identifiable information based on the originator heuristics and the recipient heuristics and based on the examined network communication; and
- performing one or more actions in conjunction with the network communication based on the determined likelihood, wherein one or more of the actions include at least one of:
- adjusting the reputation of the originator;
- adding a reference to the originator to an "allow " list; and
- adding a reference to the originator to a "block/warn " list.

17. A computer-readable medium as described in claim 16, wherein the network communication comprises a message, an email, an instant message, or a webpage.

18. A computer-readable medium as described in claim 16, wherein the network communication is transmitted over the Internet, a wide area network (WAN), a local area network (LAN), an intranet, a wireless network, or a telephone network.

19. A computer-readable medium as described in claim 16, wherein the computer-readable instructions, when executed, cause one or more processors to further perform acts including:
- analyzing data heuristics which correspond to data included in the network communication.

20. A computer-readable medium as described in claim 16, wherein one or more of the actions further include one or more of:
- blocking submission of personally identifiable information; and
- outputting a notification that describes one or more factors which indicate that the network communication likely relates to a fraudulent attempt to obtain personally identifiable information.

* * * * *

UNITED STATES PATENT AND TRADEMARK OFFICE
CERTIFICATE OF CORRECTION

| | | |
|---|---|---|
| PATENT NO. | : 7,603,718 B2 | Page 1 of 1 |
| APPLICATION NO. | : 11/095931 | |
| DATED | : October 13, 2009 | |
| INVENTOR(S) | : Robert L. Rounthwaite et al. | |

It is certified that error appears in the above-identified patent and that said Letters Patent is hereby corrected as shown below:

In column 14, line 13, after "with" insert -- the --.

In column 15, line 56, in Claim 15, delete ""allow "" and insert -- "allow" -- therefor.

In column 15, line 57, in Claim 15, delete "warn "" and insert -- warn" --, therefor.

In column 15, line 63, in Claim 16, delete "computer" and insert -- computer- --, therefor.

In column 16, line 39, in Claim 16, delete ""allow "" and insert -- "allow" --, therefor.

In column 16, line 40, in Claim 16, delete "warn "" and insert -- warn" --, therefor.

Signed and Sealed this
Eighth Day of February, 2011

David J. Kappos
*Director of the United States Patent and Trademark Office*